United States Patent
Bek et al.

(10) Patent No.: US 11,331,761 B2
(45) Date of Patent: May 17, 2022

(54) SUCTION DEVICE

(71) Applicant: C. & E. Fein GmbH, Schwaebisch Gmuend-Bargau (DE)

(72) Inventors: Fabian Bek, Boebingen (DE); Rainer Mann, Aalen-Dewangen (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 25 days.

(21) Appl. No.: 16/983,641

(22) Filed: Aug. 3, 2020

(65) Prior Publication Data

US 2021/0031321 A1 Feb. 4, 2021

(30) Foreign Application Priority Data

Aug. 2, 2019 (DE) ...................... 20 2019 104 249.4

(51) Int. Cl.
| | |
|---|---|
| *B23B 51/04* | (2006.01) |
| *B23Q 11/00* | (2006.01) |
| *B23D 61/00* | (2006.01) |
| *B27B 19/00* | (2006.01) |
| *B23D 59/00* | (2006.01) |

(52) U.S. Cl.
CPC .......... *B23Q 11/0046* (2013.01); *B23B 51/04* (2013.01); *B23B 2251/68* (2013.01); *B23B 2270/30* (2013.01); *B23B 2270/62* (2013.01); *B23D 59/006* (2013.01); *B23D 61/006* (2013.01); *B27B 19/006* (2013.01)

(58) Field of Classification Search
CPC ............ B23B 2270/30; B23B 2251/68; B23B 2270/62; B23B 2260/058; B23B 51/0406; B23Q 11/0071; B23Q 11/0046; B23D 61/006; B23D 59/006; B27B 19/006
See application file for complete search history.

(56) References Cited

U.S. PATENT DOCUMENTS

| | | | |
|---|---|---|---|
| 5,034,041 A * | 7/1991 | Austin ............... | B23Q 11/0046 55/385.1 |
| 7,726,417 B2 * | 6/2010 | Larsson .................. | E21B 21/01 175/207 |
| 10,005,163 B2 * | 6/2018 | Johnson ............... | B23B 45/003 |
| 2012/0125171 A1 | 5/2012 | Chen et al. | |
| 2013/0198996 A1 * | 8/2013 | King, Jr. ............... | B24B 55/102 15/415.1 |
| 2014/0093320 A1 * | 4/2014 | Sullivan .................... | B25F 3/00 408/67 |

FOREIGN PATENT DOCUMENTS

| | | | | |
|---|---|---|---|---|
| DE | 20 2006 005 365 U1 | 7/2006 | | |
| DE | 20 2006 009 078 U1 | 11/2007 | | |
| DE | 20 2007 010 514 U1 | 11/2007 | | |
| DE | 20 2011 052 062 U1 | 4/2012 | | |
| EP | 0558817 A2 * | 9/1993 | ......... | B23Q 11/0046 |
| EP | 1447194 A1 * | 8/2004 | ......... | B23B 51/0473 |

* cited by examiner

*Primary Examiner* — Eric A. Gates
*Assistant Examiner* — Paul M Janeski
(74) *Attorney, Agent, or Firm* — Muncy, Geissler, Olds & Lowe, P.C.

(57) ABSTRACT

A suction device for a hole saw of a hand-held power tool oscillatingly driven about an oscillation axis. A substantially disk-shaped base body has a first side that faces the hand-held power tool and a second side that faces the hole saw. A fastening section detachably fastens the suction device to an oscillatingly driven hand-held power tool; and a connecting piece connects the suction device to a suction apparatus.

13 Claims, 4 Drawing Sheets

SUCTION DEVICE

This nonprovisional application claims priority under 35 U.S.C. § 119(a) to German Patent Application No. 20 2019 104 249.4, which was filed in Germany on Aug. 2, 2019, and which is herein incorporated by reference.

BACKGROUND OF THE INVENTION

Field of the Invention

The present invention relates to a suction device for a hole saw of a hand-held power tool oscillatingly driven about an oscillation axis.

Description of the Background Art

Hole saws of this kind are known, for example, from DE 20 2011 052 062 U1, which corresponds to US 2012/0125171. They are usually used in drywall construction and are employed when holes are needed to be made in drywall or in oriented strand board, for example, for installing outlets or as passages for pipes. Hole saws are also used, however, to saw holes in parquet or other floor coverings. Hole saws are often used in combination with rotary driven machine tools such as drills, but also in combination with oscillatingly driven hand-held power tools. The use of the hole saws known from the state of the art has proven to be problematic, however, because the dust arising during work cannot be removed or can only be removed with difficulty.

Particularly when working with drywall, the arising dust leads to a not inconsiderable soiling of the user and the working environment. This is particularly problematic if subsequent holes are to be made in the walls of an already furnished living area.

SUMMARY OF THE INVENTION

It is therefore an object of the present invention to reduce the above-mentioned disadvantages.

In an exemplary embodiment, a suction device is provided for a hole saw of a hand-held power tool oscillatingly driven about an oscillation axis, with a substantially disk-shaped base body which has a first side that faces the hand-held power tool and a second side that faces the hole saw, with a fastening section for the detachable fastening of the suction device to an oscillatingly driven hand-held power tool, and with a connecting piece for connecting the suction device to a suction apparatus.

This creates a particularly simple option for removing the drilling dust which arises when a hole saw is used in combination with a hand-held power tool oscillatingly driven about an oscillation axis. The suction device can be fastened to the hand-held power tool by means of the fastening section, and the external suction apparatus, for example, a vacuum cleaner, can be connected to the connecting piece.

The connecting piece can be disposed on the first side and opens into an opening on the second side. The suctioning of the arising drilling dust from the back of the hole saw ultimately ensures that the arising drilling dust can be effectively removed in all work situations and that the suctioning does not adversely affect the work.

The connecting piece can have an angle between 20° and 50° and particularly preferably an angle of 35° with respect to a normal perpendicular to the first side. Although there is no preferred direction due to the oscillating movement of the hole saw, unlike with angle grinders, the inclination of the connecting piece offers an improved possibility for connecting the suction device to a suction apparatus.

A step can be formed on the second side at the opening of the connecting piece. As a result, the air flow is concentrated locally in a simple manner and thus the suction performance is improved.

It has also proven advantageous for the stability of the suction device if a reinforcing ring on which radial struts are formed is disposed on the first side. In this regard, it has also proven useful if the radial struts are arranged in a star shape and flatten outwards. As a result, the suction device can in particular also be made of plastic.

An axial collar can be formed on the second side for surrounding the hole saw on the outer circumference. As a result, it is possible to not only effectively remove the drilling dust arising on the back of the hole saw, therefore, on the side facing away from the workpiece. Rather, it is also possible to remove the drilling dust on the outer circumference in a particularly simple manner, because it can be sucked in through the gap between the axial collar and the outer circumference of the hole saw and can pass through it.

A ratio between the height of the axial collar and the diameter of the base body can be between 1:11 and 4:11 and particularly preferably 1.5:11. If the axial collar is too high, there is the problem that the hole saw used can no longer penetrate deep enough into the workpiece to be worked on. If, in contrast, the height of the axial collar is chosen too low, the lateral drilling dust is not effectively removed.

In order to facilitate the handling of the invention, it has also proven useful if a passage, which has a collar, is formed in the disk-shaped base body. The tool holder of the hand-held power tool can be passed in particular through the passage, and the collar, which is particularly preferably disposed on the second side of the base body, enables a seal to be achieved with respect to the tool holder, as a result of which penetration of dirt into the hand-held power tool can be prevented in a simple manner.

The ratio between a height of the collar and a height of the axial collar can be between 3:10 and 8:10 and is particularly preferably 5:10. As a result, it can be ensured that the hole saw is only surrounded to a certain degree, which prevents a negative impairment of the work performance.

The fastening section can comprise two screw sleeves. As a result, the suction device can be attached securely and in particular also non-rotatably to the hand-held power tool. In this regard, it has also proven useful if the screw connection is made from the second side. It has also proven to be favorable here if the screw heads can be received in corresponding recesses on the second side.

The two screw sleeves can be connected to one another by means of a web. This further increases the stability of the suction device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
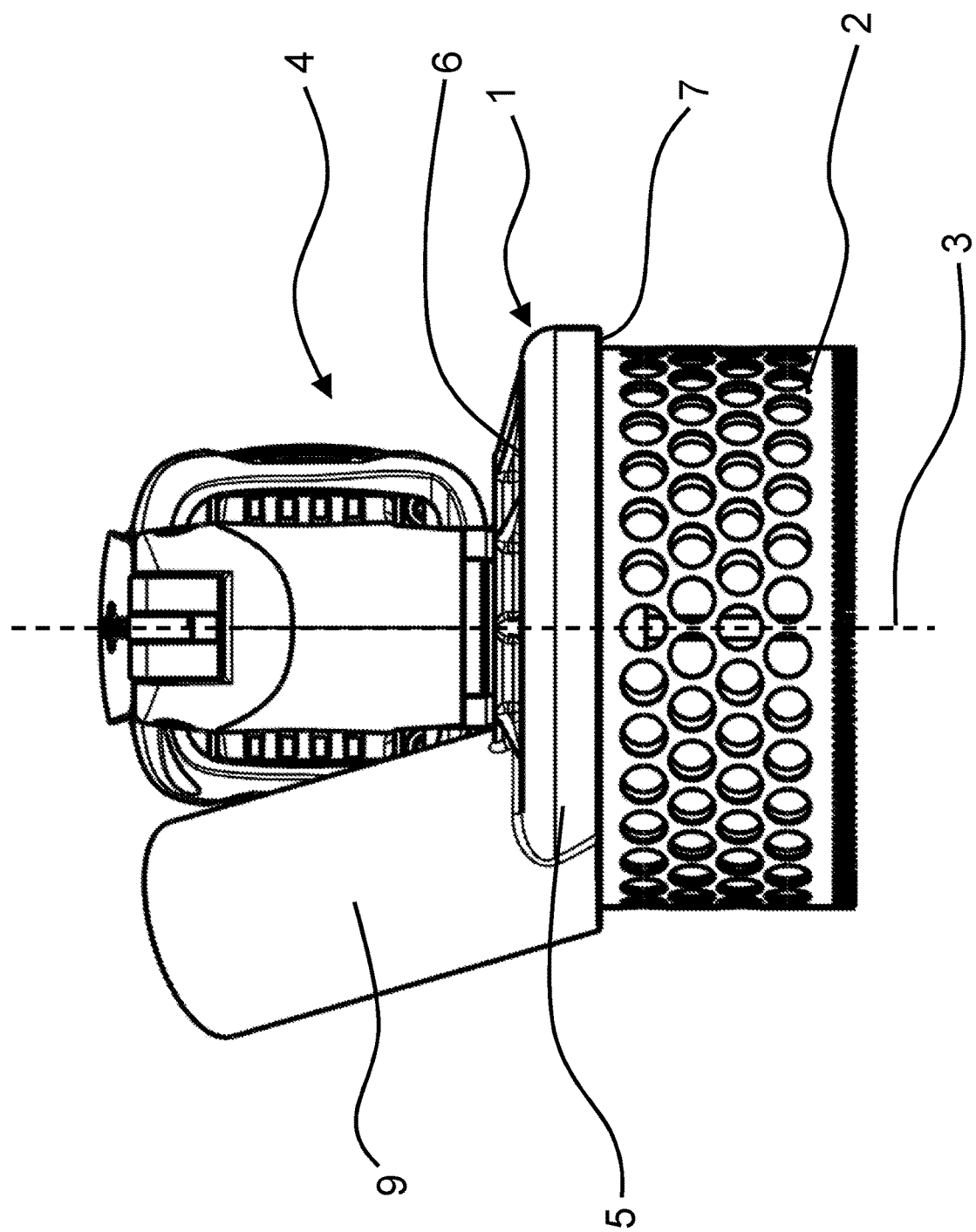
FIG. 1 shows a side view of a suction device that is attached to a hand-held power tool.

FIG. 1 shows a side view of a suction device 1 for a hole saw 2, said device which is attached to a hand-held power tool 4 oscillatingly driven about an oscillation axis 3. Suction device 1 has a substantially round, disk-shaped base body 5, which has a first side 6 that faces hand-held power tool 4 and a second side 7 that faces hole saw 2. Suction device 1 is screwed to hand-held power tool 4 with a fastening section 8 and is thus detachably fastened. In FIG. 1, a connecting piece 9 can also be seen, which is used to connect suction device 1 to a suction apparatus (not shown in the drawing), which is designed, for example, as a vacuum cleaner.

Figure 2:
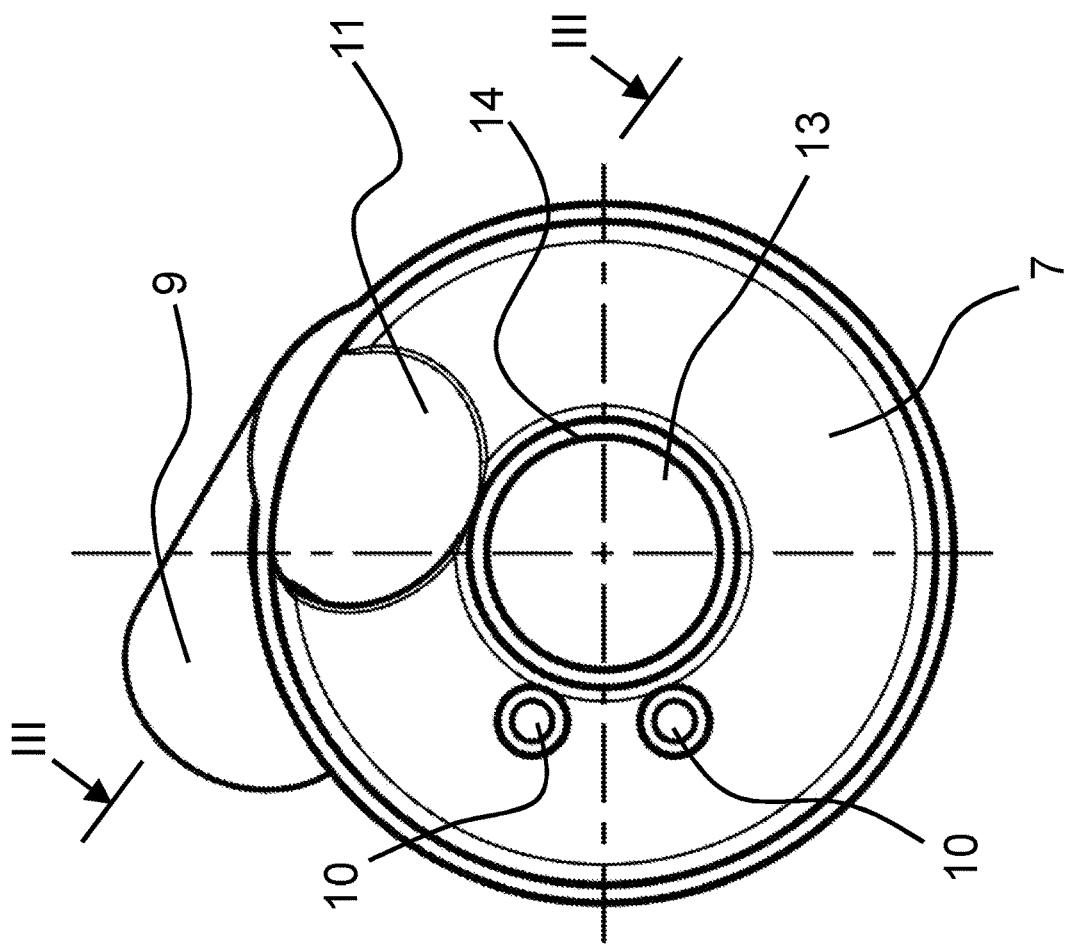
FIG. 2 shows a plan view of a second side of the suction device of the invention.

FIG. 2 shows a plan view from below of second side 7 of suction device 1 of the invention. Here, in particular, holes 10 for the screws can be seen with which suction device 1 can be screwed to hand-held power tool 4. In addition, it can be seen from FIG. 2 that connecting piece 9 is disposed on first side 6 and opens into an opening 11 on second side 7.

Figure 3:
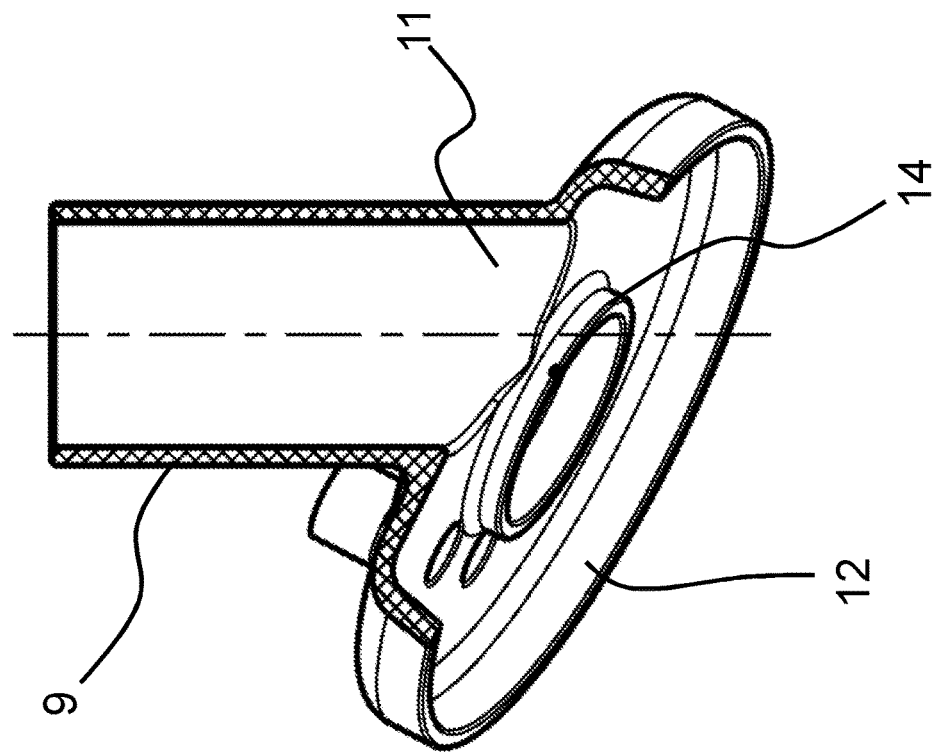
FIG. 3 shows a sectional view along the section III-III from FIG. 2.

As can be seen in particular from the sectional view shown in FIG. 3 along the section III-III from FIG. 2, connecting piece 9 is disposed on first side 6 of base body 5 and opens into opening 11 on second side 7. The sectional view of FIG. 3 also shows that an axial collar 12 is formed on second side 7 for surrounding hole saw 2 on the outer circumference. The ratio between the height of axial collar 12 and the diameter of base body 5 is between 1:11 and 3:11 and is particularly preferably 1.5:11, as in the exemplary embodiment shown. A passage 13 through which suction device 1 can be placed on the hand-held power tool is formed in the disk-shaped base body 5. Passage 13 has a collar 14 on second side 7, wherein the ratio between a height of the collar 14 and a height of the axial collar 12 is between 3:10 and 8:10 and is 5:10 in the exemplary embodiment shown.

Figure 4:
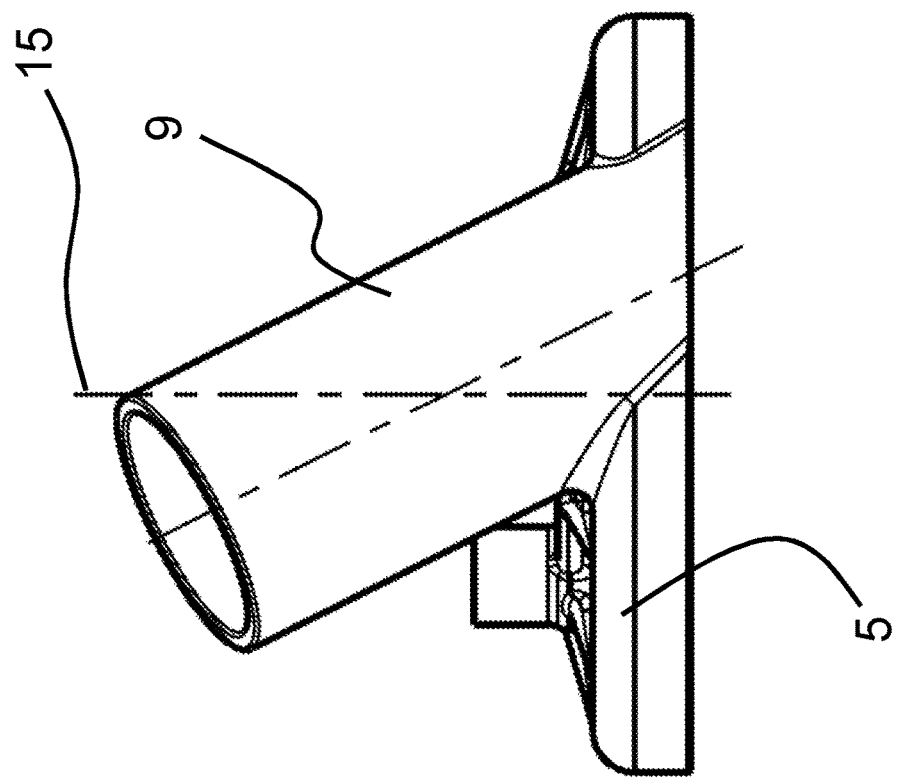
FIG. 4 shows a side view of the suction device.

FIG. 4 shows that connecting piece 9 is inclined at an angle between 20° and 50° with respect to a normal 15 which is perpendicular to first side 6 and is inclined at an angle of 35° in the exemplary embodiment shown.

Figure 5:
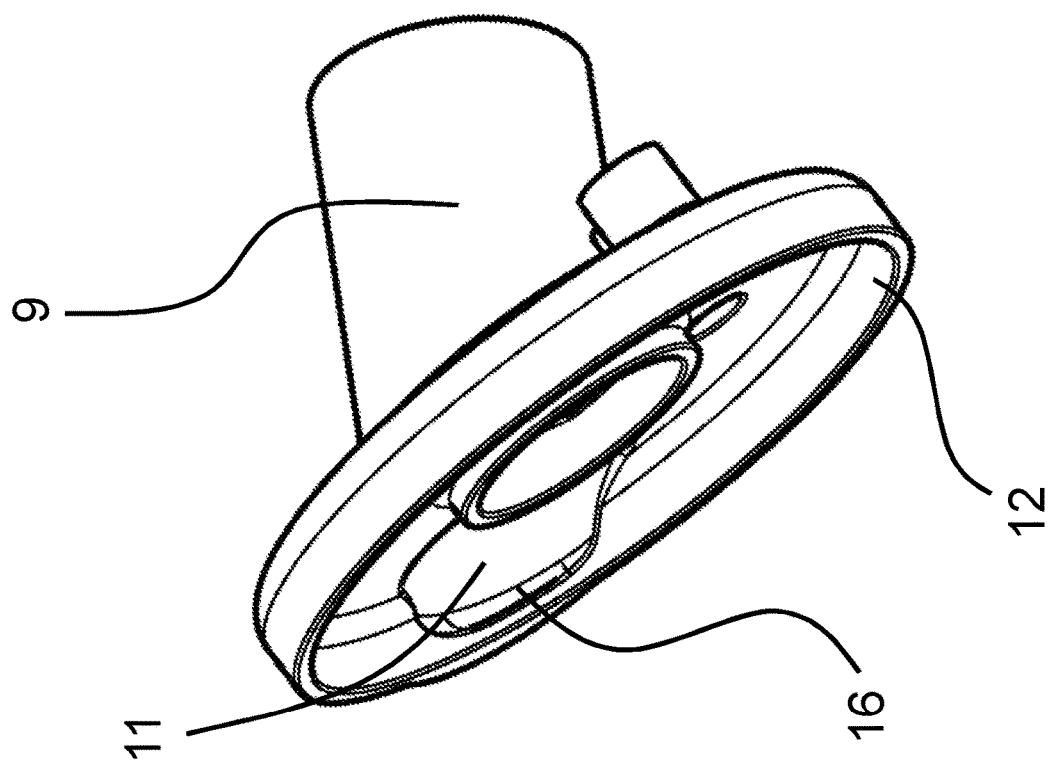
FIG. 5 shows a perspective view of the bottom of the suction device.

The perspective view of second side 7 shown in FIG. 5 makes it clear that a step 16 by means of which the air flow is accelerated for a short time is formed at opening 11 of connecting piece 9 on second side 7.

Figure 6:
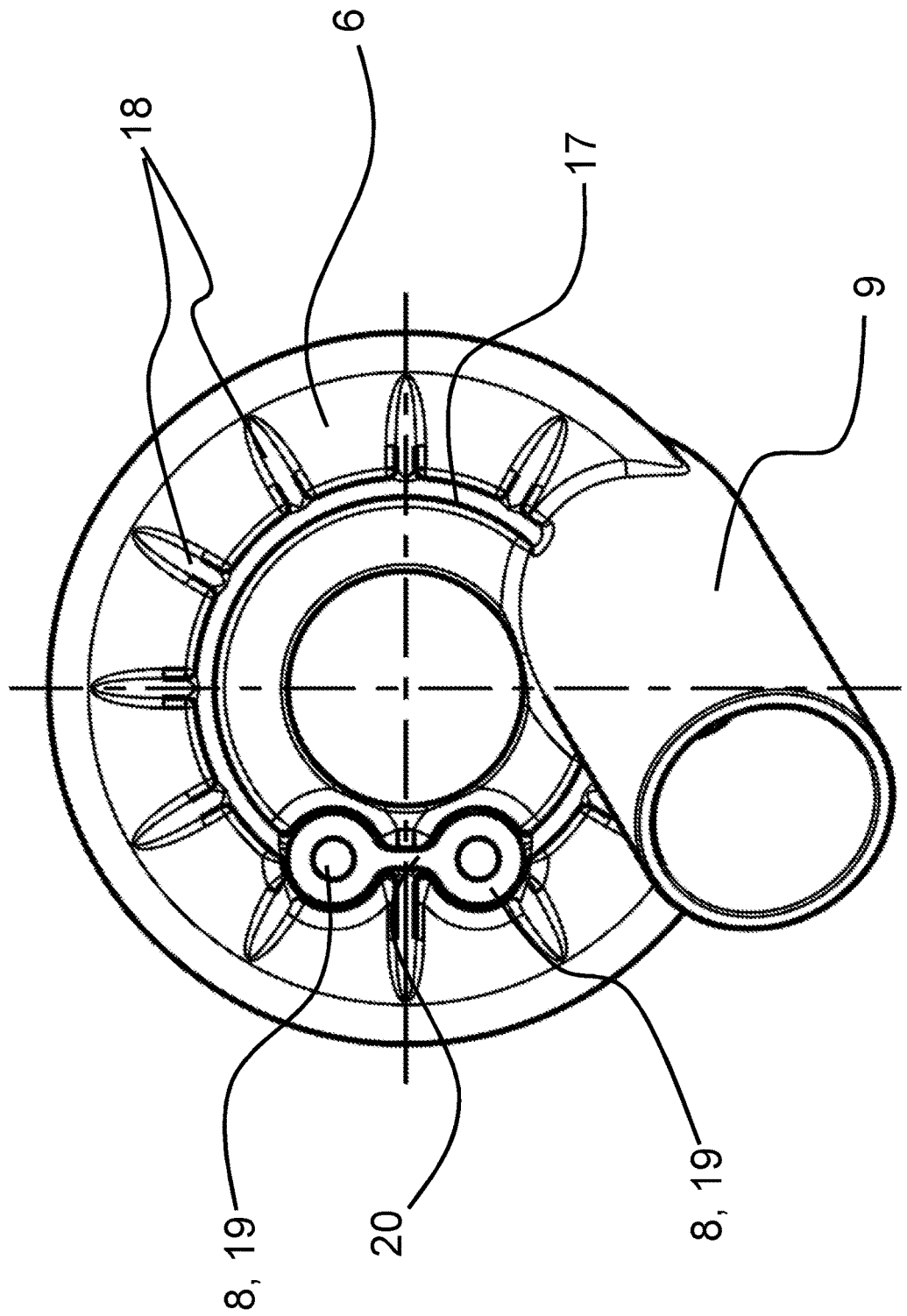
FIG. 6 shows a plan view of the top side of the suction device.

FIG. 6 shows that a reinforcing ring 17 on which radial struts 18 are formed is disposed on first side 6. Radial struts 18 are arranged in a star shape in this case and flatten outward. In addition, radial struts 18 also become increasingly narrower towards the outside. In addition, two screw sleeves 19 can be seen in FIG. 6, which form fastening section 8 and are connected to one another by means of a web 20.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A suction device for a hole saw of a hand-held power tool oscillatingly driven about an oscillation axis, the suction device comprising:
    a substantially disk-shaped base body that has a first side that faces the hand-held power tool and a second side that faces the hole saw;
    a fastening section to detachably fasten the suction device to an oscillatingly driven hand-held power tool; and
    a connecting piece to connect the suction device to a suction apparatus,
    wherein an axial collar is formed on the second side for surrounding an outer circumference of the hole saw, and
    wherein a ratio between a height of the axial collar and a diameter of the base body is between 10:110 and 30:110.

2. The suction device according to claim 1, wherein the connecting piece is disposed on the first side and opens into an opening on the second side.

3. The suction device according to claim 2, wherein a step is formed on the second side at the opening of the connecting piece.

4. The suction device according to claim 1, wherein the connecting piece has an angle between 20° and 50° with respect to a normal perpendicular to the first side.

5. The suction device according to claim 4, wherein the angle of the connecting piece with respect to the normal perpendicular to the first side is 35°.

6. The suction device according to claim 1, wherein a reinforcing ring, on which radial struts are formed, is disposed on the first side.

7. The suction device according to claim 6, wherein the radial struts are arranged in a star shape and flatten outwards.

8. The suction device according to claim 1, wherein a passage, which has a collar, is formed in the base body.

9. The suction device according to claim 1, wherein the ratio between the height of the axial collar and the diameter of the base body is 15:110.

10. A suction device for a hole saw of a hand-held power tool oscillatingly driven about an oscillation axis, the suction device comprising:
    a substantially disk-shaped base body that has a first side that faces the hand-held power tool and a second side that faces the hole saw;
    a fastening section to detachably fasten the suction device to an oscillatingly driven hand-held power tool; and
    a connecting piece to connect the suction device to a suction apparatus,
    wherein a passage, which has a collar, is formed in the base body, and
    wherein a ratio between a height of the collar and a height of the axial collar is between 3:10 and 8:10.

11. The suction device according to claim 10, wherein the ratio between the height of the collar and the height of the axial collar is 5:10.

12. A suction device for a hole saw of a hand-held power tool oscillatingly driven about an oscillation axis, the suction device comprising:

a substantially disk-shaped base body that has a first side that faces the hand-held power tool and a second side that faces the hole saw;
a fastening section to detachably fasten the suction device to an oscillatingly driven hand-held power tool; and
a connecting piece to connect the suction device to a suction apparatus,
wherein the fastening section comprises two screw sleeves.

13. The suction device according to claim 12, wherein the two screw sleeves are connected to one another via a web.

* * * * *